United States Patent [19]
Elms et al.

[11] Patent Number: 5,831,509
[45] Date of Patent: Nov. 3, 1998

[54] CIRCUIT BREAKER WITH SENSE BAR TO SENSE CURRENT FROM VOLTAGE DROP ACROSS BIMETAL

[75] Inventors: Robert Tracy Elms, Monroeville; Thomas Edward Natili, Jefferson; Michael Joseph Erb, Franklin, all of Pa.

[73] Assignee: Eaton Corporation, Cleveland, Ohio

[21] Appl. No.: 955,779

[22] Filed: Oct. 22, 1997

[51] Int. Cl.⁶ .......................... H01H 71/16; H01H 75/00; H01H 75/12; H01H 37/52
[52] U.S. Cl. .............. 337/333; 337/36; 337/70; 337/336; 335/35; 335/6; 335/37
[58] Field of Search .............. 337/6, 20, 35–37, 337/14, 105, 106, 59, 66, 70, 99, 111, 373, 378, 379; 335/23–25, 31, 35, 201; 361/42, 46–50, 93, 99, 102–105, 170

[56] References Cited

U.S. PATENT DOCUMENTS

| | | | |
|---|---|---|---|
| 3,081,386 | 3/1963 | Koenig et al. | 200/88 |
| 4,081,852 | 3/1978 | Coley et al. | 361/45 |
| 5,224,006 | 6/1993 | MacKenzie et al. | 361/45 |
| 5,301,083 | 4/1994 | Grass et al. | 361/64 |
| 5,459,630 | 10/1995 | MacKenzie et al. | 361/45 |
| 5,519,561 | 5/1996 | Mrenna et al. | 361/105 |
| 5,706,154 | 1/1998 | Seymour | 361/42 |

*Primary Examiner*—Leo P. Picard
*Assistant Examiner*—Anatoly Vortman
*Attorney, Agent, or Firm*—Martin J. Moran

[57] ABSTRACT

The stray inductance created by the loop formed by voltage sensing conductors connected to opposite ends of the bimetal in a miniature circuit breaker for determining load current is reduced by joining a voltage sense bar to the free end of the bimetal. The voltage sense bar extends beside the bimetal toward the fixed end of the bimetal where an insulated wire connected to the free end of the sense bar forms a twisted pair with an insulated wire secured to the fixed end of the bimetal.

10 Claims, 2 Drawing Sheets

CIRCUIT BREAKER WITH SENSE BAR TO SENSE CURRENT FROM VOLTAGE DROP ACROSS BIMETAL

BACKGROUND OF THE INVENTION

1. Field of the Invention

This invention relates to circuit breakers in which the voltage drop across the bimetal of the thermal-magnetic trip device provides a representation of load current for use, for instance, in an electronic trip circuit such as an arc fault detector or for metering purposes. More particularly, it relates to such a circuit breaker which utilizes a sense bar extending alongside the bimetal for reducing stray inductance which can affect the sensed current.

2. Background Information

The small circuit breakers commonly used for residential and light commercial purposes have a thermal-magnetic device for tripping the circuit breaker to interrupt current flow in the protected circuit. The thermal-magnetic device includes a bimetal which heats up and bends in response to persistent overcurrent conditions to unlatch a spring powered operating mechanism which opens the contacts. An armature is attracted by very high overcurrents such as those associated with a short circuit to also unlatch the spring powered operating mechanism to trip the circuit breaker open. Until recently, there has been no simple, economical way of measuring the current through such low cost circuit breakers which are often referred to as miniature circuit breakers. U.S. Pat. No. 5,519,561 has solved this problem by utilizing the voltage drop across the bimetal of the thermal-magnetic device as a measure of the current. As all of the current passes through the bimetal connected in series with the separable contacts of the circuit breaker, and the resistance of the bimetal is a stable, measurable quantity, the voltage drop across the bimetal provides a convenient, economical representation of the load current. U.S. Pat. No. 5,519,561 teaches that this arrangement for measurement of load current can be used in an electronic trip circuit within the circuit breaker such as an arc fault detector, or for other purposes such as metering.

In such miniature circuit breakers, the bimetal and the two voltage sensing leads connected to the two ends of the bimetal form a loop which introduces stray inductance into the circuit. As the resistance of the bimetal is quite small, and therefore the voltage signal is small, even the small amount of stray inductance produced by this loop can have an noticeable affect on the sensed current. The amount of stray inductance can be reduced by reducing the area of the loop formed by the bimetal and the voltage sensing conductors. The problem is compounded by the fact that the bimetal is fixed at one end, and the other cantilevered end is free to move, and in fact must do so to trip the circuit breaker. In some miniature circuit breakers it has been possible to route the voltage sensing lead connected to the free end of the bimetal along the bimetal to reduce the loop area. However, in other circuit breakers this has not been successful, such as in those circuit breakers in which a solenoid which implements the electronic trip, such as for a ground fault, is positioned adjacent to the bimetal. In such arrangements, routing the voltage sensing lead connected to the free end of the bimetal can interfere with operation of the circuit breaker.

There is a need therefore for an improved arrangement for sensing current through a circuit breaker using the voltage drop across the bimetal of a thermal-magnetic trip device.

There is a need for such a circuit breaker in which the stray inductance introduced by the current sensing circuit is minimized.

There is an additional need for such a circuit breaker in which the current sensing circuit with reduced stray inductance does not interfere with the operation of the circuit breaker.

There is an additional need for such an improved circuit breaker which is simple and economical.

SUMMARY OF THE INVENTION

These needs and others are satisfied by the invention which is directed to a circuit breaker having an overcurrent trip device including a bimetal connected in series with the separable contacts of the circuit breaker to actuate an operating mechanism and open the contacts in response to selected overcurrent conditions. The circuit breaker has a voltage sensing circuit which includes first and second conductors connected to first and second ends of the bimetal, respectively, to sense a voltage across the bimetal representative of current flowing through the circuit breaker. The first conductor is a sense bar joined to the bimetal adjacent to a first or free end of the bimetal and extending beside the bimetal toward the second or fixed end. The circuit breaker also includes means responsive to the current represented by the sensed voltage such as an arc fault detector. The sense bar is joined to the free end of the bimetal and therefore moves with it. This reduces the area of the loop formed by the bimetal and the conductors to thereby reduce the stray inductance of the voltage sensing circuit. Preferably, the sense bar extends to the second fixed end of the bimetal and insulated wires connected to the fixed end of the bimetal and to the free end of the sense bar are routed in close proximity to one another, and preferably as a twisted pair, to the response means. The sense bar has a main section extending beside the bimetal and a terminal section extending generally transversely from the main section to the bimetal adjacent the free end of the bimetal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
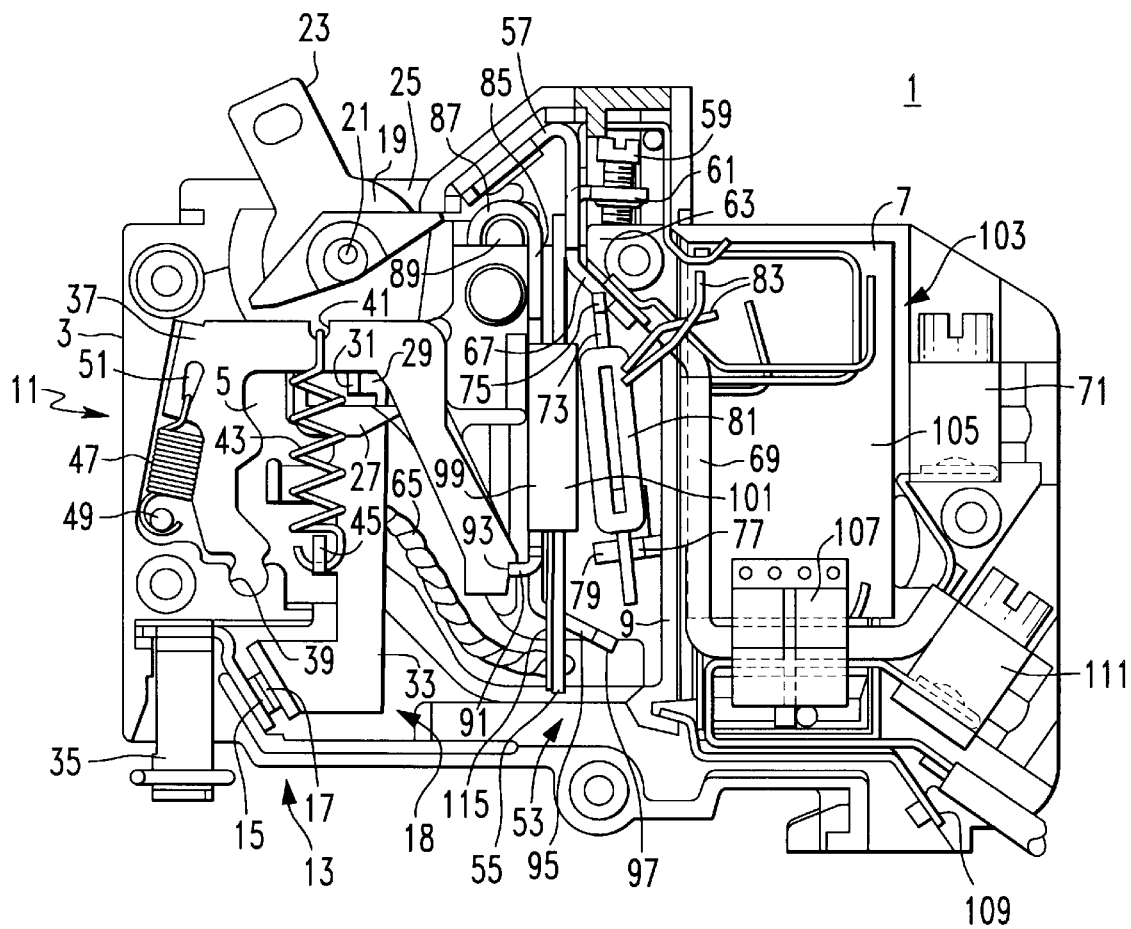
FIG. 1 is an elevation view of a circuit breaker incorporating the invention and with the cover removed.

The invention will be described as applied to the ¾ inch circuit breaker provided by Cutler-Hammer, Eaton Corporation, but it will be apparent that it has applications to other circuit breakers including a bimetal which is used to sense current through the circuit breaker. Referring to FIG. 1, the circuit breaker 1 has a molded insulating housing 3 which is shown with the cover removed. The housing 3 has a pole compartment 5 and an electronic trip compartment 7 separated by a vertical molded wall 9. Mounted in the pole compartment 5 is a pole mechanism 11 which is similar to that described in U.S. Pat. No. 5,301,083 which is hereby incorporated by reference. As this pole mechanism is well known it will only be described briefly.

The pole mechanism 11 has a pair of separable contacts 13 including a stationary contact 15 and a moveable contact 17, and an operating mechanism 18 for opening and closing the separable contacts. This operating mechanism 18 includes a molded insulating operator 19 rotatably journalled on cylindrical bosses 21 received in recesses formed in the housing and cover (not shown). An operating handle 23 of the operator 19 extends upwardly through an opening 25 in the housing 3 for external manual operation of the breaker. Operator 19 has a dependent leg 27 opposite the handle 23. Leg 27 has an aperture 29 receiving a tab 31 of a moveable contact arm 33 to pivotally attached the moveable contact arm 33 to the operator 19. Moveable contact arm 33 has the moveable contact 17 mounted thereto for engagement with the stationary contact 15 mounted to stationary contact terminal arm and clip 35 at the lower left corner of the pole compartment 5 of the housing for external circuit connection to the line side of the circuit.

A generally inverted U-shaped latch lever 37 is pivotally mounted at its left end as shown in FIG. 1 within a semi-cylindrical recess 39 in the housing 3. Latch lever 37 has a notch 41 formed approximately centrally thereof which receives the upper hooked end of a spring 43. The other hooked end of the spring 43 is connected to the moveable contact arm 33 at tab 45. Spring 43 connects the latch lever 37 to the moveable contact arm 33 under tension, thereby biasing the moveable contact arm 33 clockwise about its pivotal attachment to operator 19 and biasing the latch lever 37 clockwise about the pivot formed at recess 39. In the ON position of the breaker in FIG. 1, spring 43 provides contact closing force for the contacts 13. A second helical tension spring 47 is connected between a boss 49 of the housing 3 and the left leg of the latch lever 37 at aperture 51, in opposition to the bias provided by spring 43. Spring 47 operates to automatically reset the latch lever 37 after the breaker has tripped and to move the handle 23 to the OFF position. When the circuit breaker is in its ON state as shown in FIG. 1, spring 47 is almost fully relaxed, providing little opposing bias to latch lever 37. However, when the circuit breaker trips and the latch lever 37 moves in a clockwise direction about the pivot 39, spring 47 becomes stretched to provide a reverse or counterclockwise bias to the latch lever 37, to be described, thereby urging latch lever 37 back to a reset position.

A thermal-magnetic trip device 53 is located in the pole compartment 5 to the right of the latch lever 37. A bimetal member 55 is affixed at its upper end, such as by welding, soldering, or the like, to one leg of a V-shaped support conductor 57. The other leg of the V-shaped support conductor is secured to the housing 3. An adjustment screw 59 threaded through a tab on 61 on the support conductor 57 bears against a molded ledge 63 in the housing to bend the support conductor 57 and thereby adjusting the position of the lower end of the bimetal 55. This adjustment calibrates the predetermined current at which the breaker will respond to a persistent overcurrent.

A braided shunt conductor 65 is affixed at its right end to the lower or free end of the bimetal 55 by soldering, welding, brazing or the like. The other end of the shunt conductor 65 is similarly affixed to the moveable contact arm 33. The support conductor 57 has an angularly downwardly extending tab 67 to which is connected a load conductor 69 which extends through the electronic compartments 7 and is connected to a load terminal 71.

The magnetic portion of the trip structure 53 includes an elongated pole piece 73 having ear 75 at its upper end pivoted in the housing about which the pole piece swings in an arc as guided and limited by a tab 77 engaging a recess 79 in the housing 3. Carried by the pole piece 73 is a trip coil 81 for the electronic trip to be described. Leads 83 from the trip coil extends into the electronic compartment 7.

An armature 85 has an upper end 87 hooked around a boss 89 in the housing 3, and a hook 91 adjacent the lower end engaging a notch 93 in the latch lever 37. A lower leg 95 extending angularly downward from the lower end of the armature 85 has a laterally (out of the plane of FIG. 1) extending finger 97. The central portion 99 of the armature 85 is U-shaped in horizontal cross-section with legs 101 (only one visible in FIG. 1) extending to the right in FIG. 1 toward the pole piece 73 and straddling the bimetal 55.

In operation, current from a supply source is fed to the circuit breaker 1 through line terminal 35 and stationary contact 15 to moveable contact 17, contact arm 33, shunt 65, bimetal 55, support conductor 57, load conductor 69 and load terminal 71. In the event of a prolonged overcurrent condition, bimetal 55 will heat, and the lower end will deflect to the right in FIG. 1 and engage the finger 97 to pull leg 95 and the armature 85 to the right. This will pull the hook 91 on the armature 85 out of engagement with the notch 93 of the latch lever 37. When so released, latch lever 37 pivots clockwise about the pivot 39 under the influence of the spring 43. This clockwise movement of the latch lever 37 carries the upper end of the spring 43 across the plane of the pivot provided by the tab 45 on the operator 19 to effect counterclockwise movement of the contact arm 33 about this pivotal connection. This opens the separable contacts 13 by moving the moveable contact 17 away from the stationary contact 15. This movement of the contact arm 33 shortens the operating length of the spring 43, relaxing it to nearly solid condition having its line of action directed to the left of the pivot of the operator 19, thereby applying a clockwise moment to the operator. Thereafter, spring 47 urges the latch lever 37 counterclockwise to its reset position, moving contact arm 33 and spring 43 therewith. Spring 43 then becomes fully relaxed and acts as a solid link to rotate the operating handle 23 clockwise to an OFF position of the circuit breaker 1 (not shown).

When bimetal 55 cools and returns to its original, normal position, the lower end of the bimetal moves clockwise away from the finger 97 and the armature 85 rocks clockwise about the boss 89 such that the hook 91 on the armature 85 engages the notch 93 to relatch the mechanism. Subsequent rotation of the operator 19 counterclockwise about the pivot formed by the boss 21 to move the handle clockwise to the ON position carries the pivot connection of aperture 29 in the operator 19 and tab 31 on moveable contact arm 33 overcenter of the line of action of the spring 43, thereby closing the separable contacts 13. In the event of a sudden large increase in current flow through the circuit breaker 1, the magnetic structure takes over to rapidly trip the circuit breaker before the bimetal responds to the increased current. Current flow from the shunt 65 through the bimetal 55 induces a magnetic flux within the U-shaped armature central portion 99. This magnetic flux attracts the pole piece 73 to pivot clockwise until the tab 77 is stopped by the left edge of the recess 79. Thereafter armature 85 is attracted counterclockwise toward the pole piece 73 to move the hook 91 on a lower end of the armature out of engagement with the notch 93, to release latch lever 37 and open the separable contacts 13 in the manner described above.

In addition to the thermal magnetic trip structure 53, the circuit breaker 1 includes an electronic trip 103. Preferably, the electronic trip 103 responds to arc faults and ground faults. Such arc fault and ground fault response of electronic trip circuits is known, for example see U.S. Pat. No. 5,519, 561. The circuitry for the electronic trip function is implemented on a printed circuit board 105 which is mounted in the electronic compartment 7. Ground fault currents are sensed by the electronic trip unit 103 by a current transformer 107 through which the load conductor 69 passes. A neutral lead 109 also passes through the toroidal current transformer and is connected at one end to a neutral load terminal 111 and at the other end to a pigtail (not shown) for connection to a neutral line side bus bar (also not shown). For detection of arc currents, the voltage across the bimetal 55 is measured as taught in U.S. Pat. No. 5,519,561. As discussed above, this can be accomplished by connecting electrical leads to the opposite ends of the bimetal 55 for connection to the printed circuit board 105. However, as also previously mentioned, the loop formed by these wires and the bimetal can introduce stray inductance into the sensing circuit. This stray inductance can be reduced by directing the wire connected to the lower end of the bimetal up along the bimetal until it reaches the lead connected to the upper end. These leads are then twisted to form a twisted pair leading to the printed circuit board 105. However, in the circuit breaker shown, the trip coil 81 mounted on the pole piece 73 is energized by the electronic trip unit 103 in response to the detection of a ground fault or an arc fault. The magnetic field generated by the trip coil 81 attracts the armature 85 to trip the circuit breaker in the manner discussed in connection with a magnetic trip by the thermal magnetic trip device 53. It has been found that routing a current sense wire along side the bimetal can interfere with this operation of the circuit breaker.

Figure 2:
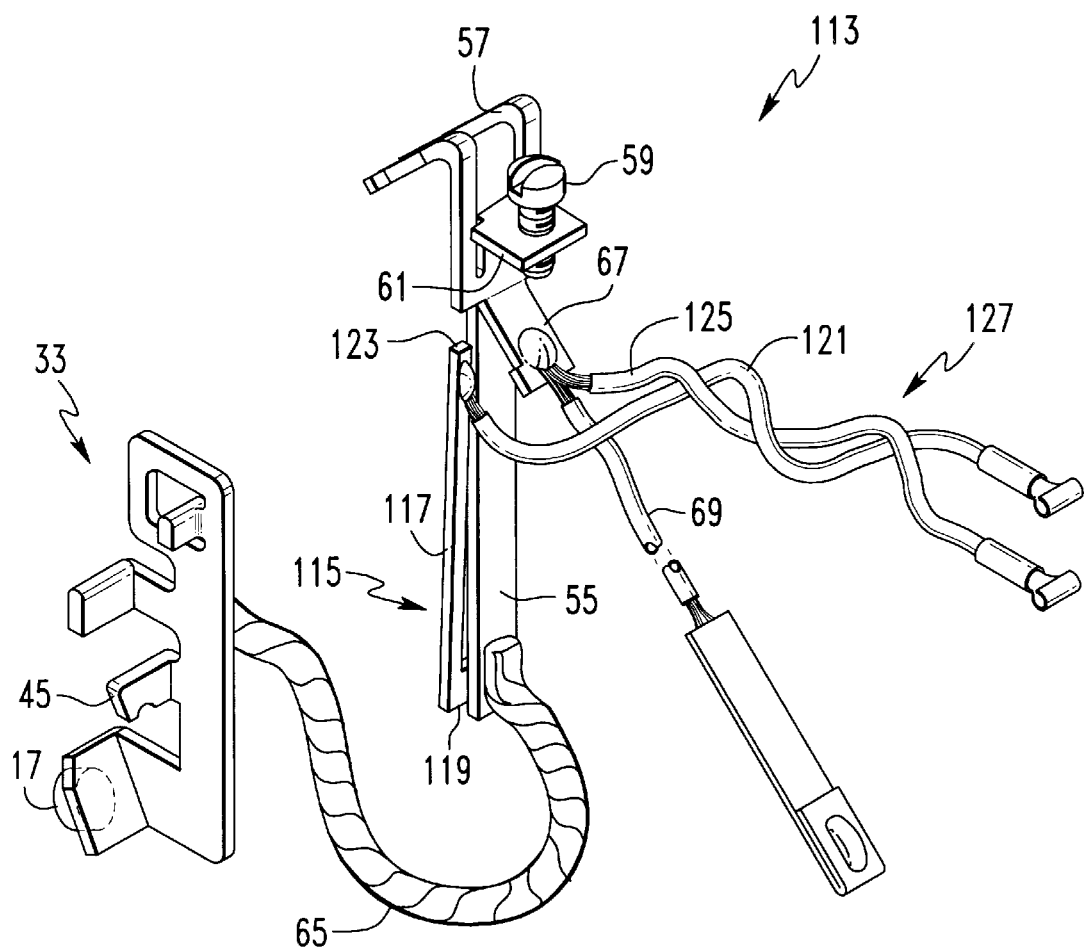
FIG. 2 is an isometric view of the bimetal assembly of the circuit breaker of FIG. 1 incorporating the invention.

As best seen in FIG. 2, the voltage sensing circuit 113 for sensing the voltage across the bimetal 55 which is representative of the current flowing through the circuit breaker 1 includes a first conductor in the form of a sense bar 115. The sense bar 115 has a main section 117 and a terminal section 119 extending transversely from one end of the main section. The terminal section 119 is affixed to the free end of the bimetal 55 such as by welding so that the main section 117 extends generally beside the bimetal toward the fixed end of the bimetal. The first conductor then further includes an insulated wire 121 connected to the free end 123 of the sense bar. The voltage sensing circuit 113 also includes a second conductor in the form of an insulated wire 125 which is affixed to the second end of the bimetal 55. In particular, the second conductor 125 is secured to the support conductor 57. However the support conductor 57 has a much lower resistance than the bimetal, so that the insulated wire 125 senses the voltage at the fixed end of the bimetal. The two insulated wires 121 and 125 are then twisted to form a twisted pair 127 leading to the printed circuit board 105. It can be seen from FIG. 2 that with the sense bar 115 extending along side in close proximity to the bimetal 55, and with the insulated wires 121 and 125 twisted to form a twisted pair, the area of the loop formed by the voltage sensing circuit 113 is minimal which minimizes any stray inductance in the circuit. At the same time, the sense bar 115 being stiff and connected to the free end of the bimetal where it moves with the bimetal does not interfere with the operation of the trip unit.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A circuit breaker for protecting an electrical system, said circuit breaker comprising:

separable contacts connected in series with said electrical system;

an operating mechanism opening said separable contacts when actuated;

an overcurrent trip device including a bimetal having first and second ends connected in series with said separable contacts and being responsive to selected overcurrent conditions in said electrical system for actuating said operating mechanism; and a voltage sensing circuit including a first conductor and a second conductor connected to said first and second ends of said bimetal, respectively, to sense a sensed voltage across said bimetal representative of current flowing through said bimetal, said first conductor comprising a sense bar joined to said bimetal adjacent to said first end and extending generally beside said bimetal toward said response means responsive to said sensed voltage representative of current flowing through said bimetal.

2. The circuit breaker of claim 1 wherein said second end of said bimetal is fixed and said first end is free, and wherein said sense bar moves with said free, first end of said bimetal.

3. The circuit breaker of claim 2 wherein said second conductor comprises an insulated wire, said sense bar extends beside said bimetal substantially to said second end of said bimetal and terminates in a free end, and said first conductor further includes another insulated wire connected to said free end of said sense bar and routed to said response means in close proximity to said insulated wire.

4. The circuit breaker of claim 3 wherein said insulated wire and said another insulated wire are twisted about one another to form a twisted pair of wires.

5. The circuit breaker of claim 4 wherein said sense bar has a main section extending generally beside said bimetal and a terminal section extending generally transversely from said main section to said bimetal adjacent said first end of said bimetal.

6. The circuit breaker of claim 5 wherein said response means comprises an arc fault detector actuating said operating mechanism in response to predetermined conditions of said sensed voltage representing current through said bimetal indicative of an arcing fault.

7. The circuit breaker of claim 2 wherein said sense bar has a main section extending generally beside said bimetal and a terminal section extending generally transversely from said main section to said bimetal adjacent said first end of said bimetal.

8. The circuit breaker of claim 1 wherein said second conductor comprises an one insulated wire, said sense bar extends beside said bimetal substantially to said second end of said bimetal and terminates in a free end, and said first conductor further includes another insulated wire connected to said free end of said sense bar and routed to said response means in close proximity to said one insulated wire.

9. The circuit breaker of claim 8 wherein said response means comprises an arc fault detector actuating said operating mechanism in response to predetermined conditions of said sensed voltage representing current through said bimetal indicative of an arcing fault.

10. The circuit breaker of claim 9 wherein said sense bar has a main section extending generally beside said bimetal and a terminal section extending generally transversely from said main section to said bimetal adjacent said first end of said bimetal.

* * * * *